No. 794,850. PATENTED JULY 18, 1905.
T. F. BRYAN.
ROAD GRADER.
APPLICATION FILED DEC. 8, 1904.
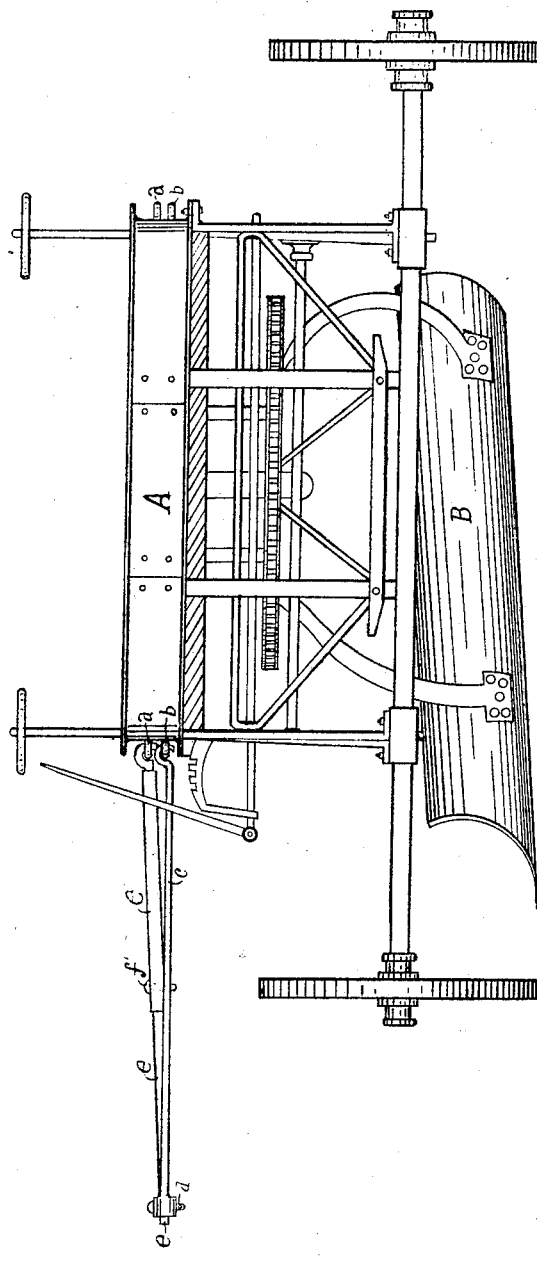
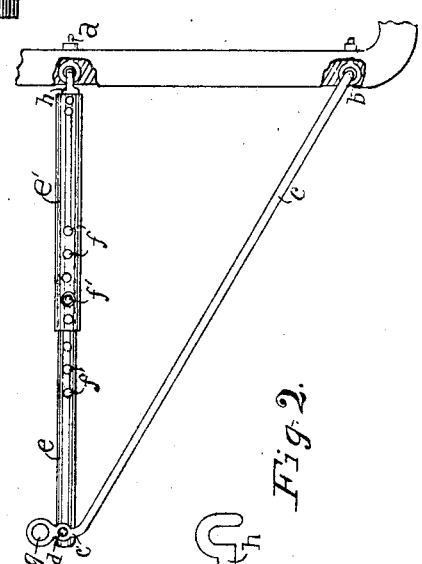
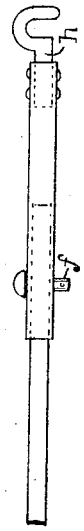
Witnesses:
Flora Custer
Nelson Everist
Inventor.
Thomas F Bryan
per A. D. Marble
Attorney No. 794,850.

Patented July 18, 1905.

UNITED STATES PATENT OFFICE.

THOMAS F. BRYAN, OF PONCA, OKLAHOMA TERRITORY.

ROAD-GRADER.

SPECIFICATION forming part of Letters Patent No. 794,850, dated July 18, 1905.

Application filed December 8, 1904. Serial No. 236,052.

*To all whom it may concern:*

Be it known that I, THOMAS F. BRYAN, a citizen of the United States, residing at Ponca, in the county of Kay and Territory of Oklahoma, have invented new and useful Improvements in Road-Graders, of which the following is a specification.

My invention relates to improvements in road-graders by providing means for attaching a horse or horses to either side of the grader, using for that purpose a rod or chain attached to the side of the framework of the grader and a brace-bar having one end loosely attached to the frame of the grader some distance in advance of where the draft rod or chain is attached, said rod having its forward end provided with means for attaching a horse or horses, also means for attaching the outer end of the brace-bar thereto, all hereinafter more fully explained.

The objects of my invention are, first, to provide a convenient means for attaching one or more horses to the side of road-graders to assist in propelling the grader and at the same time to prevent it from sliding sidewise, commonly termed "crawling," away from the moving earth; second, for attaching to either side of the grader by the same device; third, a telescoping brace-bar for regulating the distance at which the horse or horses may be attached; fourth, to enable the grader to operate successfully on ground having a greater inclination; fifth, by attaching the draft near the rear of the grader the rear ditch-wheel is prevented from climbing and cutting the bank, insuring a clean ditch or furrow and less draft; sixth, to prevent the grader from upsetting; seventh, to enable the grader to work successfully in loose or sandy soil. I attain these objects by the mechanism illustrated in the accompanying drawings, forming a part of this specification, in which—

Figure 1 is a rear elevation. Fig. 2 is a plan view of the attaching device. Fig. 3 is a side elevation of the brace-bar. Fig. 4 is a sectional elevation of the draft-rod.

Similar letters refer to similar parts throughout the several views.

In Fig. 1, A is the upper framework of a "Western reversible grader" having the eyebolts $a$ and $b$ securely attached thereto, the latter being near the rear end of the side and into which is hooked the draft chain or rod $c$, the outer end of which is provided with an opening $c'$ for the admission of and in which is secured by pin $d$ the outer end of brace-bar $e\ e'$, composed of two pieces of gas-pipe, one portion $e'$ being larger and admitting therein the smaller portion $e$. The connecting ends of the two parts are provided with holes $f\ f$, adapted to receive a bolt or pin $f'$, which secures in position the two portions $e$ and $e'$ of the brace-bar when properly adjusted as to length. The inner end of part $e'$ of brace-bar has inserted and secured therein a hook $h$ for attaching to eyebolt $a$. The opening $g$ in the front end of the draft-rod $c$ is for the attachment of a swingletree or doubletree clevis, and in operation the draft comes near the rear end of the grader and tends to guide it straight, while the pressure on the blade B when moving earth tends to crowd the rear of the machine away from the moving earth. The lateral tendency being greater in some cases and conditions of ground than others, the side draft can be regulated by the extension or shortening of the brace-bar $e\ e'$ to suit the occasion, and the horse or horses can have a straight pull while traveling.

Having thus described my invention, what I claim as new and useful, and desire to secure by Letters Patent, is—

In a road-grader, a device for attaching to the side thereof one or more horses, said device consisting of eyebolts firmly secured to the sides of the grader-frame the rear eyebolt having loosely attached thereto a draft chain or rod, preferably, a rod having its outer end provided with a proper opening for a swingletree or doubletree clevis and close in rear of said clevis opening a horizontal or other opening in which is secured, by a bolt or pin, the outer end of a telescoping brace-bar the inner end of which is loosely attached to the more centrally located eyebolt, substantially as described, and for the purposes set forth.

In testimony whereof I affix my signature in presence of two subscribing witnesses.

THOMAS F. BRYAN.

Witnesses:
F. C. MOREY,
M. E. STEWART.